(12) United States Patent
Laskaris et al.

(10) Patent No.: US 7,969,049 B2
(45) Date of Patent: Jun. 28, 2011

(54) HIGH POWER DENSITY COOLING OF ELECTRICAL MACHINES USING CERAMIC TUBES OF HIGH THERMAL CONDUCTIVITY

(75) Inventors: Evangelos Trifon Laskaris, Schenectady, NY (US); Kirubaharan Sivasubramaniam, Clifton Park, NY (US); James Pelligrino Alexander, Ballston Lake, NY (US); William Dwight Gerstler, Niskayuna, NY (US); James William Bray, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 897 days.

(21) Appl. No.: 11/610,905

(22) Filed: Dec. 14, 2006

(65) Prior Publication Data

US 2008/0143199 A1    Jun. 19, 2008

(51) Int. Cl.
*H02K 9/00* (2006.01)
*H02K 9/20* (2006.01)

(52) U.S. Cl. ............... 310/52; 310/53; 310/54; 310/59; 310/60 A; 310/61

(58) Field of Classification Search .............. 310/261, 310/258, 259, 260, 52–54, 59, 214–215, 310/261.1, 60 A, 270
See application file for complete search history.

(56) References Cited

U.S. PATENT DOCUMENTS

| | | | |
|---|---|---|---|
| 3,609,420 A | 9/1971 | Inagaki et al. | |
| 3,634,705 A | 1/1972 | Fidei et al. | |
| 3,648,085 A | 3/1972 | Fujii | |
| 4,517,479 A | 5/1985 | Aleem et al. | |
| 5,682,074 A * | 10/1997 | Di Pietro et al. | 310/215 |
| 5,731,645 A | 3/1998 | Clifton et al. | |
| 5,765,596 A * | 6/1998 | LaHaye et al. | 138/38 |
| 6,438,969 B1 | 8/2002 | Laskaris et al. | |
| 6,489,697 B1 * | 12/2002 | Ozawa et al. | 310/54 |
| 6,624,547 B1 | 9/2003 | Emery | |
| 7,183,678 B2 * | 2/2007 | Sivasubramaniam et al. | 310/64 |
| 2002/0070621 A1 * | 6/2002 | Mori et al. | 310/215 |
| 2004/0100154 A1 * | 5/2004 | Rahman et al. | 310/54 |
| 2006/0038450 A1 * | 2/2006 | Matin et al. | 310/58 |
| 2006/0200971 A1 * | 9/2006 | Lanoue et al. | 29/602.1 |

FOREIGN PATENT DOCUMENTS

WO     WO 9917422 A1 *  4/1999

OTHER PUBLICATIONS

Web Page www.matweb.com/tools/unitconverter.apsx (1996-2010).*
Definition of "duct" from Merriam Webster's Dictionary, tenth edition, 2001.*

* cited by examiner

*Primary Examiner* — Quyen Leung
*Assistant Examiner* — Jose A Gonzalez Quinones
(74) *Attorney, Agent, or Firm* — Penny A. Clarke

(57) ABSTRACT

A high power density generator contains an armature structure having a plurality of conductors and at least one heat transfer tube thermally coupled to the conductors. The tube is hollow so as to allow a heat transfer fluid to pass through it. The tube is made of a material having a thermal conductivity λ of at least 20 W/mK, an electrical breakdown strength of at least 60 V/mil, and a mechanical strength adequate for handling, manufacturing and operation. In an embodiment of the invention, the tube is made of a ceramic material.

24 Claims, 2 Drawing Sheets

HIGH POWER DENSITY COOLING OF ELECTRICAL MACHINES USING CERAMIC TUBES OF HIGH THERMAL CONDUCTIVITY

STATEMENT REGARDING FEDERALLY SPONSORED RESEARCH OR DEVELOPMENT

This invention was made with Government support under Contract FA8650-04-G-2466 awarded by the U.S. Air Force. The Government has certain rights in the invention.

BACKGROUND OF THE INVENTION

This invention relates to electrical machines and generators, and more particularly to thermal management of high power density electrical machines.

In the field of power generation, high speed motors and power generators have been developed for various power generation applications. High speed motors and generators are advantageous to many challenging applications because their high-speed nature allows for greater power density over other types of power generators, among other advantages. High power density means that a comparable amount of power (over other types of power generators) is available in a much smaller volume and weight. Stated differently, with a high speed motor or power generation device, the overall size and weight of the device is reduced relative to other machines capable of providing the same amount of power/energy. This is advantageous in those applications where weight and size need to be minimized, for example, to make the device easily transportable.

However, there are also disadvantages of having an increased power density. One of the more important disadvantages is the generation of large amounts of heat per unit volume. High power density results in a high current density, which directly relates to Joule heating. Because of the smaller volume of the machine, this heat can become problematic, as getting the heat out of the machine is difficult. Moreover, if the heat is not removed effectively, the machine will eventually fail.

An additional disadvantage with high-speed, high power density machines is the losses created by the high frequency of the alternating current. The use of high frequency alternating current means that smaller cross-section conductors (made of copper filaments for example) must be used to carry the current. The use of small strand diameters is used to minimize these losses. However, the use of these smaller strand/conductor diameters makes it more difficult to remove the heat from high power density machines.

As stated above, the heat load must be removed efficiently to protect the electrical system and primarily the electrical insulation system. Namely, for the machine to operate, electrical circuits must be maintained, and electrical insulation between strands, between turns, and between coils are necessary for this task. If the temperature limits of the insulation are exceeded, the insulation will break down and a short can occur. This can lead to a failure of the entire machine.

Previous methods to remove heat from power generation devices include using hollow strands or conductors and passing a heat transfer fluid through the conductors. However, as indicated above in high-speed, high power density machines there is a need to reduce strand size, and thus this methodology can not be effectively used.

Other methods include natural or forced convention (i.e. air cooling). However, in high power density machines both of these methods are insufficient for removing the large amount of heat generated.

An additional method uses indirect liquid cooling. In this method heat is conducted through various paths to reach the liquid coolant, but the liquid coolant does not directly contact the strands/conductors. In this method, liquid is pumped through a metal tube, which is placed near the conductors. However, because the tube is metal it must be insulated (to prevent electrical shorting), and this insulation causes the temperature to rise in the conductors, as the insulation essentially acts as a thermal barrier. Moreover, the wall thickness of the metal tubes often needs to be relatively thick to ensure proper function, thus adding to the relative size and weight of the power generator.

Therefore, there still exists a need to effectively and efficiently remove a high amount of heat from high power density machines.

SUMMARY OF THE INVENTION

In an embodiment of the present invention, a generator comprises at least one armature structure having a plurality of conductors, and at least one hollow heat transfer duct thermally coupled to the armature structure. The hollow heat transfer duct comprises a material having a thermal conductivity of at least 20 W/mK and an electrical breakdown strength of at least 60 V/mil.

BRIEF DESCRIPTION OF THE DRAWINGS

The advantages, nature and various additional features of the invention will appear more fully upon consideration of the illustrative embodiment of the invention which is schematically set forth in the figures, in which.

DETAILED DESCRIPTION OF THE INVENTION

The present invention will be explained in further detail by making reference to the accompanying drawings, which do not limit the scope of the invention in any way.

Figure 1:
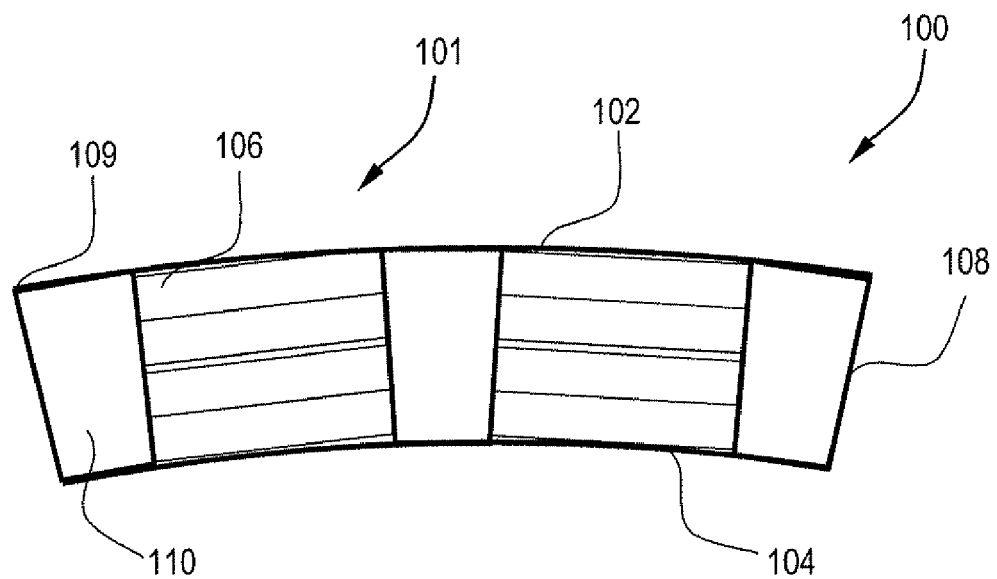
FIG. 1 is a diagrammatical representation of a portion of an armature of a high density power generator and a heat transfer tube in accordance with an embodiment of the invention.

FIG. 1 depicts a portion of an armature section 101 of a power generation device 100. In an embodiment of the present invention, the power generation device 100 is a high density power generation device. Because the general construction and makeup of power generation devices and high power density power generation devices is known by those of ordinary skill in the art, a detailed discussion of this structure is not included herein. The depicted armature section 101 (or stator portion) is the portion of a high power density power generation device, which generates the most heat during operation.

The armature section 101 has both an outer shell 102 and an inner shell 104 which contain the armature section components. These shells 102, 104 are known and of a typical construction and makeup. The present invention is not limited in this regard.

Within the armature shells 102, 104 are a plurality of conductors 106. In FIG. 1, the conductors 106 are shown as flat armature bars. However, the present invention is not limited in this regard, and the conductors 106 can be of any known shape or cross-section. However, the geometry selected should be such as to maximize operational efficiency and heat transfer properties. Of course, when used in high power density applications, as indicated previously, it is desirable to minimize the cross-section of the conductors 106 or to build the conductors of insulated strands.

Between respective groupings of conductors 106 a heat transfer tube 108 is positioned which has a wall portion 109 and a hollow potion 110. During operation, a heat transfer fluid (not shown) is passed through the hollow portion 110 so as to effect the transfer of heat. The fluid can be any known effective heat transfer medium, as the present invention is not limited in this regard. In an exemplary embodiment of the invention, the fluid is de-ionized water.

In an embodiment of the invention, the heat transfer tube 108 is constructed from a material having a thermal conductivity of at least 20 W/mK. In a further embodiment, the material has a thermal conductivity of at least 30 W/mK. Additionally, the material has an electrical breakdown strength of at least 60 V/mil, and in a further embodiment has an electrical breakdown strength of at least 250 V/mil. Therefore, the material has a relatively high thermal conductivity and electrical breakdown strength. Thus, unlike metals, the material can conduct heat efficiently while at the same time providing improved electrical insulation characteristics.

In a further embodiment, the material is of sufficient mechanical strength such that any forces (such as impact forces) which are experienced during manufacture, operation, and/or maintenance do not damage or break the walls 109 of the tube 108. In a further embodiment, the material is selected to have a low mass density to provide for weight savings. For example, alumina has a mass density of about 4 g/cm$^3$, which is less than that of metals used in prior art applications.

By having the above characteristics, the heat transfer tube 108 allows for the efficient transfer of heat from the conductors 106 to the heat transfer fluid, while at the same time providing the necessary electrical insulation. Because of the above electrical insulation, mass density and strength characteristics, the walls 109 can be thinner than those of an insulated/metal tube system, thus, utilizing less space and providing less weight.

In an exemplary embodiment of the invention, the material used for the wall 109 of the tube 108 is a ceramic material. In a further exemplary embodiment, the material is alumina ($Al_2O_3$). Other alternative embodiments include berrylia, aluminum nitride and silicon carbide, and any blends thereof. Additionally, it is contemplated that some plastics may also be used for the walls, provided that the plastics provide the appropriate thermal conductivity and electrical breakdown strength needed for the application.

The shape of the tube(s) 108 is a function of the design parameters of the generator 100, armature 101 and conductors 106. It is contemplated that any cross-section and/or configuration can be used, so long as it is manufacturable. In an embodiment of the invention, the tubes 108 are designed such that the spacing between the walls 109 and the conductors 106 is minimized, for better thermal conductivity. In a further embodiment, the tubes 108 and walls 109 are configured such that they are in physical contact with the conductors 106 when installed. The wall thickness for the walls 109 is to be selected based on operational and design parameters, and may be made thicker for applications where impact resistance and strength is a concern. It is noted that the present invention is not limited in this regard, except that a thickness is to be chosen which provides the needed electrical insulation and thermal conductivity. In FIG. 1 the overall shape of the tube 108 is that of a trapezoid because of the circular nature of the armature structure 101 (i.e. the tube 108 is wider adjacent the outer shell 102 then the portion of the tube 108 adjacent the inner shell 102). However, in a further embodiment the cross-section of the tube 108 is circular, oval, rectangular, square, etc.

In an alternative embodiment of the invention (not shown) the thickness of the wall 109 is not uniform around the perimeter of the tube 108. For example, the wall thickness at the top and bottom of the tube 108 (adjacent the shells 102, 104) are made thinner than the walls adjacent the conductors 106, which require more electrical insulation strength.

During operation, heat is generated in the conductors 106 due to various reasons (for example, electrical current losses, ohmic losses, eddy current losses and magnetic historetic losses). This heat is transferred either directly or via an epoxy (discussed in more detail below) to the walls 109 of the tube 108. The heat then propagates through the tube wall 109 and is transferred to the medium passing through opening 110 in the tube 108. In an embodiment of the invention, the medium is passed continuously through the opening 110, during operation. In another embodiment of the invention the rate and/or pressure of the medium flow varies depending upon the operation of the device 100. For example, the flow is faster during higher temperature operations and slower during lower temperature operations.

The medium can be of any known heat transfer medium which can be passed through a tube and which is chemically compatible with it. In fact, in the embodiment of the present invention where the tube 108 is made of a ceramic material allows for the use of fluids, which are corrosive to metallic tubes. It is noted that to ensure efficient and durable operation the fluid and tube wall material used should be compatible with each other, so that no corrosion or erosion of the wall occurs.

Further, the medium may be passed through the tube(s) 108 using any known means. For example, it is contemplated that a pump may be used in conjunction with a reservoir and a heat exchanger. Further, the flow rate and pressure of the medium are to be determined based on operational and design parameters.

In the embodiment shown in FIG. 1 the walls 109 of the tube 108 are smooth. However, it is contemplated that the inner surface and/or outer surface of the walls 109 have protrusions, concavities, vanes, or the like to further enhance the heat transfer capabilities. For example, in an embodiment of the invention, protrusions extend from the inner surface of the wall 109 into the opening 110. These protrusions provide additional surface area for heat transfer. Alternatively, dimples or concavities may also be employed.

In an alternative embodiment, protrusions and/or vanes extend from an outer surface of the walls 109 to provide additional surface area for heat transfer. For example, it is contemplated that protrusions extend, at least partially, into gaps created by and/or between the conductors 106.

In a further exemplary embodiment, the tubes 108 are made up of more than one material. In one embodiment, the tubes 108 are made from a blend of ceramics, such as those discussed above. However, in a further embodiment it is contemplated that at least a portion of either the inner and/or outer surfaces of the walls 109 are covered with a second material.

Figure 2:
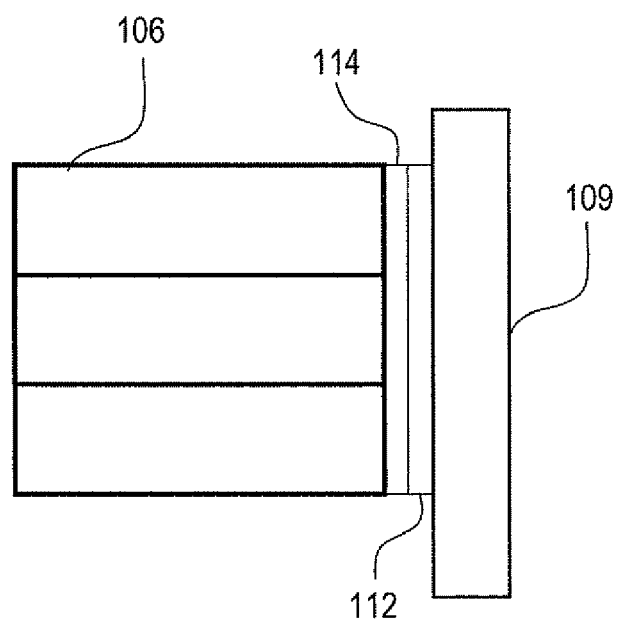
FIG. 2 is a diagrammatical representation of a cross-section of an embodiment of the present invention coupled to a armature of a high power density power generator.

Turning now to FIG. 2, the wall 109 of the tube 108 is shown adjacent to an edge of a conductor 106. Between the wall 109 and the conductor 106 are two layers of epoxy 112 and 114. In a further embodiment, any filler or adhesive may be used. Although two layers of epoxy/filler/adhesive are shown in FIG. 2, it is contemplated that only a single layer may be used, or in an alternative embodiment, more than two layers are used. The epoxy/adhesive/filler is employed to fill any gaps between the conductor 106 and the wall 109. This ensures maximum thermal conductivity. If the conductor 106 does not make direct contact with the wall 109, the presence of any air gap effectively creates a thermal block (because air has a thermal conductivity of about 0.03 W/mK). Thus, the use of an epoxy, or similar material, provides for the efficient thermal transmission of heat from the conductor 106 to the wall 109.

In an embodiment of the present invention, the epoxy/filler/adhesive is selected to have a relatively high thermal conductivity, to maximize heat transfer to the walls 109. Additionally, the filler/epoxy/adhesive is to be selected so as to be compatible with the materials in which it contacts, such as the wall 109 and the conductors 106. Moreover, in an embodiment of the invention, the epoxy/filler/adhesive is electrically insulating and provides for relatively easy manufacturability to ensure that any distance between the wall 109 and the conductor 106 is minimized.

In an embodiment of the present invention, the distance between the wall 109 and the conductor 106 is to be as small as possible, to maximize thermal conductivity. It is understood that because of manufacturing tolerances that at least some distances may exist, and the gaps are to be filled with a thermally conductive epoxy. In an embodiment of the invention, the epoxy/filler/adhesive has a thermal conductivity of at least 1 W/mK, and in another embodiment has a thermal conductivity of 2.5 W/mK.

In an additional exemplary embodiment, the epoxy/filler/adhesive contains a filler or filler material to increase its thermal conductivity. For example, the epoxy/filler/adhesive may contain metal powder or alumina grains to increase thermal conductivity.

In a further embodiment of the present invention, two different epoxies/fillers/adhesives are used. For example, the layer 112 may have a thermally conductive additive (such as metal), whereas the layer 114 does not, or vice versa.

Figure 3:
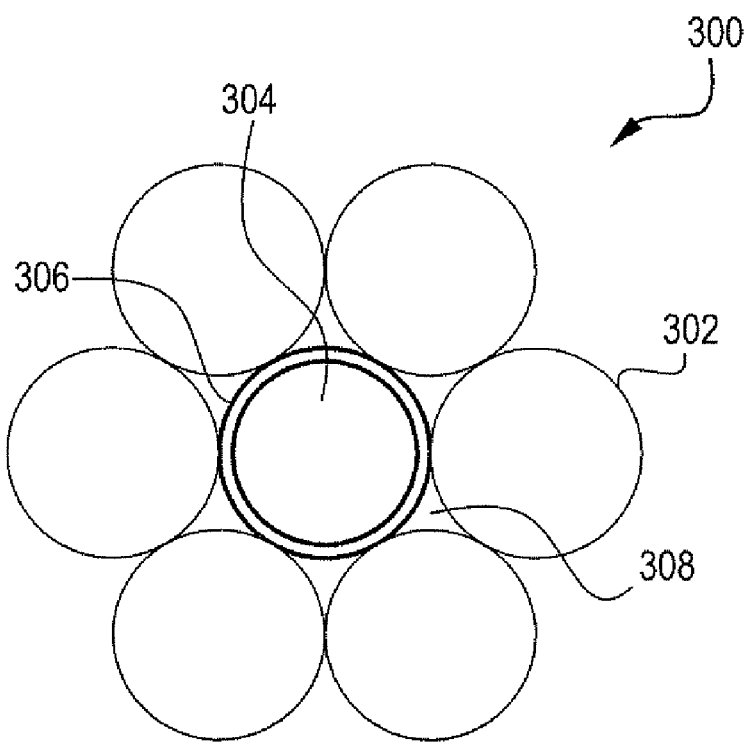
FIG. 3 is a diagrammatical representation of another embodiment of the present invention.

Turning now to FIG. 3, an additional embodiment of the present invention is shown. In this figure a conductor bundle 300 is shown having a plurality of conductors 302 surrounding a circular heat transfer duct 304, having wall 306. Between the conductors 302 and the wall 306 is an epoxy 308. The epoxy/filler/adhesive may or may not have a thermally conductive additive. Further, although not shown, additional heat transfer ducts 304 may be positioned on the outside of the conductors 302.

While the above discussion has been primarily directed to the use of the cooling tubes 108 in an armature of a power generator, the present invention is not limited in this regard. Namely, the present invention may also be used in cooling components within the generator stator which are heated due to eddy-current and magnetic hysteresis losses. Typically, these causes of excess heat occur within the core or yoke of the generator, which are made of magnetic metals. Accordingly, an embodiment of the invention may be used within the core or yoke of a power generating device to provide cooling thereof.

Figure 4:
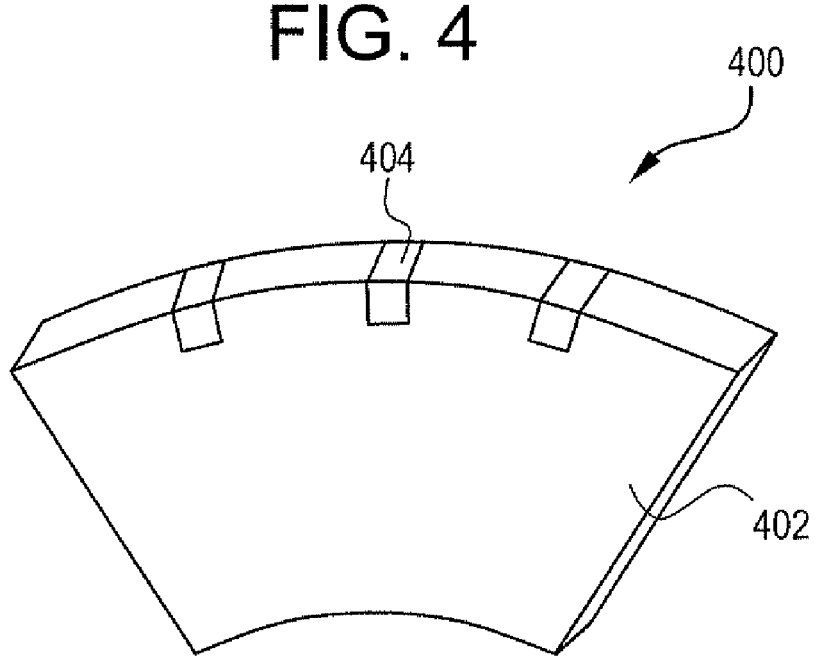
FIG. 4 is a diagrammatical representation of a portion of core of a power generator and a heat transfer tube in accordance with an embodiment of the invention.

FIG. 4 depicts a diagrammatical representation of an embodiment of the present invention within a generator core 400. The generator core 400 contains at least a core portion 402 and cooling tubes 404. The tubes 404 are coupled to the core portion 402 in a similar fashion to that shown in FIG. 1 and 2, and may or may not employ an epoxy/filler/adhesive, depending on the dimensional tolerances. In this embodiment, the cooling tubes 404 will aid in thermally managing the temperature of the core portion 402 in a similar fashion to that described above.

It is noted that although the present invention has been discussed above specifically with respect to high density power generator applications, the present invention is not limited to this and can be in any similar applications where the need to cool electrical components is desired, for example low density and/or low speed power generators or power electronics.

While the invention has been described in terms of various specific embodiments, those skilled in the art will recognize that the invention can be practiced with modification within the spirit and scope of the claims.

What is claimed is:

1. A generator, comprising:
    at least one armature structure comprising a plurality of conductors; and
    at least one hollow heat transfer duct thermally coupled to said at least one armature structure;
    wherein said at least one hollow heat transfer duct comprises a material having a thermal conductivity of at least 20 W/mK and an electrical breakdown strength of at least 60 V/mil, and wherein the material is selected from the group consisting of ceramic, alumina, berrylia, aluminum nitride, silicon carbide, and combinations thereof.

2. The generator of claim 1, wherein said thermal conductivity is at least 30 W/mK.

3. The generator of claim 1, wherein said electrical breakdown strength is at least 250 V/mil.

4. The generator of claim 1, wherein the material is ceramic.

5. The generator of claim 1, wherein the material is any one of alumina, berrylia, aluminum nitride and silicon carbide, or a blend thereof.

6. The generator of claim 1, wherein a fluid is passed through a hollow portion of said at least one tube.

7. The generator of claim 1, further comprising at least one layer of an epoxy, filler or adhesive that thermally couples said at least one conductor to said at least one duct.

8. The generator of claim 7, wherein said at least one layer of epoxy, filler or adhesive contains a thermally conductive filler.

9. The generator of claim 7, wherein said epoxy, filler or adhesive has a thermal conductivity of at least 1 W/mK.

10. The generator of claim 1, further comprising a core portion, wherein said core portion comprises at least one other hollow heat transfer duct thermally coupled to said core portion.

11. A generator, comprising:
    at least one armature structure comprising a plurality of conductors; and
    at least one hollow heat transfer duct thermally coupled to said at least one armature structure;
    wherein said at least one hollow heat transfer duct comprises a ceramic material having a thermal conductivity of at least 20 W/mK and an electrical breakdown strength of at least 60V/mil.

12. The generator of claim 11, wherein said thermal conductivity is at least 30 W/mK.

13. The generator of claim 11, wherein said electrical breakdown strength is at least 250 V/mil.

14. The generator of claim 11, wherein the ceramic material is any one of alumina, berrylia, aluminum nitride and silicon carbide, or a blend thereof.

15. The generator of claim 11, wherein a fluid is passed through a hollow portion of said at least one tube.

16. The generator of claim 11, further comprising at least one layer of epoxy, filler or adhesive that thermally couples said at least one conductor to said at least one duct.

17. The generator of claim 16, wherein said at least one layer of epoxy, filler or adhesive contains a thermally conductive filler.

18. The generator of claim 16, wherein said epoxy, filler or adhesive has a thermal conductivity of at least 1 W/mK.

19. The generator of claim 11, further comprising a core portion, wherein said core portion comprises at least one other hollow heat transfer duct thermally coupled to said core portion.

20. A generator, comprising:
   at least one of an armature structure comprising a plurality of conductors and a core portion; and
   at least one hollow heat transfer duct thermally coupled to either one of said at least one armature structure and said core portion;
   wherein said at least one hollow heat transfer duct comprises a material having a thermal conductivity of at least 20 W/mK and an electrical breakdown strength of at least 60 V/mil, and wherein the material is selected from the group consisting of ceramic, alumina, berrylia, aluminum nitride and silicon carbide, and combinations thereof.

21. The generator of claim 20, wherein a second hollow heat transfer duct is thermally coupled to the other of said at least one armature structure and said core portion.

22. The generator of claim 20, wherein said thermal conductivity is at least 30 W/mK.

23. The generator of claim 20, wherein said electrical breakdown strength is at least 250 V/mil.

24. The generator of claim 20, further comprising at least one layer of an epoxy, filler or adhesive that physically separates said at least one hollow heat transfer duct from said either one of: one or more of said conductors and said core portion and thermally couples said at least one hollow heat transfer duct with said either one of: one or more of said conductors and said core portion.

* * * * *